(12) United States Patent
Stauner (10) Patent No.: US 8,966,741 B2
(45) Date of Patent: Mar. 3, 2015

(54) METHOD OF MAKING AND ASSEMBLING A ONE-PIECE SLOPED CEILING BAFFLE

(75) Inventor: Joseph B. Stauner, Algonquin, IL (US)

(73) Assignee: Schneider Electrical USA, Inc., Palatine, IL (US)

( * ) Notice: Subject to any disclaimer, the term of this patent is extended or adjusted under 35 U.S.C. 154(b) by 259 days.

(21) Appl. No.: 13/467,208

(22) Filed: May 9, 2012

(65) Prior Publication Data

US 2012/0287648 A1 Nov. 15, 2012

Related U.S. Application Data

(60) Provisional application No. 61/486,128, filed on May 13, 2011.

(51) Int. Cl.
*B23P 17/00* (2006.01)
*F21V 33/00* (2006.01)
*B29C 45/00* (2006.01)

(52) U.S. Cl.
CPC ............ *F21V 33/006* (2013.01); *B29C 45/0055* (2013.01)
USPC ............................ 29/527.1; 362/365; 362/366

(58) Field of Classification Search
CPC ............ F21V 7/10; F21V 17/10; F21V 17/18; F21V 21/04; F21V 21/041–21/044; F21V 21/14
USPC ....................... 29/527.1, 525.01; 362/365, 366
See application file for complete search history.

(56) References Cited

U.S. PATENT DOCUMENTS

| | | | |
|---|---|---|---|
| 4,729,080 A | 3/1988 | Fremont et al. | |
| 5,373,431 A | 12/1994 | Hayman et al. | |
| 5,457,617 A * | 10/1995 | Chan et al. | 362/366 |
| D383,565 S | 9/1997 | Demshki, Jr. et al. | |
| 5,823,664 A | 10/1998 | Demshki, Jr. et al. | |

OTHER PUBLICATIONS

Cooper Lighting: "HALO®, H47T, 6" Slope Ceiling Recessed Downlighting Incandescent," p. 180. Downloaded from http://www.goodmart.com/pdfs/halo/H47T.pdf on Jul. 25, 2012.

* cited by examiner

*Primary Examiner* — Moshe Wilensky
(74) *Attorney, Agent, or Firm* — Locke Lord LLP (57) ABSTRACT

A one-piece, sloped baffle includes a generally cylindrical central opening having a central axis extending between an open circular end and an open elliptical end. A plane defining the open circular end is perpendicular to the central axis. A plane defining the open elliptical end is at an oblique angle relative to the central axis. The baffle further includes an opening extending between the ends and a pair of opposing edges substantially parallel with the central axis and on opposite sides of the opening. First projections are positioned on opposite sides of the opening and aligned with the opposing edges. Second projections are positioned on opposite sides of the opening at a radial distance from the first projections. The baffle further includes a plurality of grooves that extend circumferentially around an inner surface of the baffle.

31 Claims, 8 Drawing Sheets

METHOD OF MAKING AND ASSEMBLING A ONE-PIECE SLOPED CEILING BAFFLE

CROSS-REFERENCE TO RELATED APPLICATION

This application claims the benefit of U.S. Provisional Application No. 61/486,128, filed May 13, 2011, which is hereby incorporated by reference herein in its entirety.

FIELD OF THE INVENTION

The present disclosure relates to baffles for lighting fixtures, and, more particularly, to one-piece, sloped baffles for lighting fixtures installed in a sloped ceiling.

BACKGROUND

Prior sloped baffles used in lighting fixtures include a two-piece design that requires the precise alignment of the two pieces and clamping together of the same prior to installation of the baffle into a lighting fixture. Alignment of the two pieces is difficult and can result in an imperfect alignment of internal features of the baffle, which negatively impacts the baffle's ability to diffuse light uniformly and negatively affects the aesthetics of the baffle. Additionally, the two-piece design includes two vertical seams that also negatively affects the aesthetics of the baffle. The present disclosure addresses these and other problems.

BRIEF SUMMARY

The present disclosure describes a one-piece, sloped baffle for use in a lighting fixture installed in a sloped ceiling. The disclosed one-piece, sloped baffle is formed using an injection molding process that results in the one-piece, sloped baffle having an opening or vertical slot that extends the entire height of the baffle. The vertical slot can be spread apart or widened after the molding of the one-piece, sloped baffle, which is necessary to remove the one-piece, sloped baffle from a portion of the mold (e.g., core portion of the mold) without damaging an internal feature (e.g., at least one groove) of the one-piece, sloped baffle. The widening of the vertical slot is a necessary step because the internal feature prevents the one-piece, sloped baffle from being removed from the mold otherwise.

The vertical slot also results in an assembled one-piece, sloped baffle having only one seam as compared to two seams in the prior art two-piece baffle. The one seam can be advantageously placed along the shortest vertical portion of the one-piece, sloped baffle to minimize its negative impact on the aesthetics of the one-piece, sloped baffle when installed. The vertical slot also reduces the number of parts and necessary steps when assembling the one-piece, sloped baffle. Specifically, fasteners such as spring clips or clamps are only needed to hold the one seam together as compared to the two seams in the prior art two-piece baffle. Additionally, the one-piece design eliminates the need for having to align two baffle pieces prior to assembling the same with spring clips or clamps.

BRIEF DESCRIPTION OF THE DRAWINGS

The foregoing and other advantages of the invention will become apparent upon reading the following detailed description and upon reference to the drawings.

While the description is susceptible to various modifications and alternative forms, specific embodiments have been shown by way of example in the drawings and will be described in detail herein. It should be understood, however, that the description is not intended to be limited to the particular forms disclosed. Rather, the description is to cover all modifications, equivalents, and alternatives falling within the spirit and scope of the description as defined by the appended claims.

DETAILED DESCRIPTION

Referring generally to FIGS. 1-5, a one-piece, sloped baffle 10 includes a generally cylindrical central opening 20 having a central axis 30 extending between an open circular end 50 and an open elliptical end 60. The one-piece, sloped baffle 10 is configured to be used in a lighting fixture (not shown) installed in a sloped structure (e.g., a sloped ceiling) (not shown) or orientation, where the sloped structure is offset from horizontal. It is contemplated that the one-piece, sloped baffle 10 can be used in lighting fixtures installed in non-sloped structures. The one-piece, sloped baffle 10 can be formed from a variety of materials, such as, plastic or metal. A few non-limiting examples of suitable types of plastics include glass-filled polyester, thermosetting plastics, phenolic plastics. Examples of lighting fixtures installed in sloped ceilings suitable for use with the baffles of the present disclosure are shown and described in U.S. Pat. No. 4,729,080, which is hereby incorporated by reference herein in its entirety.

The open circular end 50 is defined by a plane that is perpendicular to the central axis 30. The open elliptical end 60 is defined by a plane that is at an oblique angle, $\alpha$, relative to the central axis 30. The oblique angle, $\alpha$, of the plane defining the open elliptical end 60 of the baffle is designed to substantially match the slope of the ceiling or structure containing the lighting fixture (not shown) including the one-piece, sloped baffle 10. The oblique angle, $\alpha$, can be any angle, such as, for example, any angle between about five and about seventy-five degrees. For another example, the oblique angle, $\alpha$, can be any angle between about ten and about thirty degrees.

The one-piece, sloped baffle 10 has an outer generally cylindrical surface 15 (best shown in FIG. 1) that extends from the open circular end 50 to the open elliptical end 60. The open elliptical end 60 includes an elliptical flange 18 that has a generally elliptical shape (best shown in FIG. 1).

Figure 1:
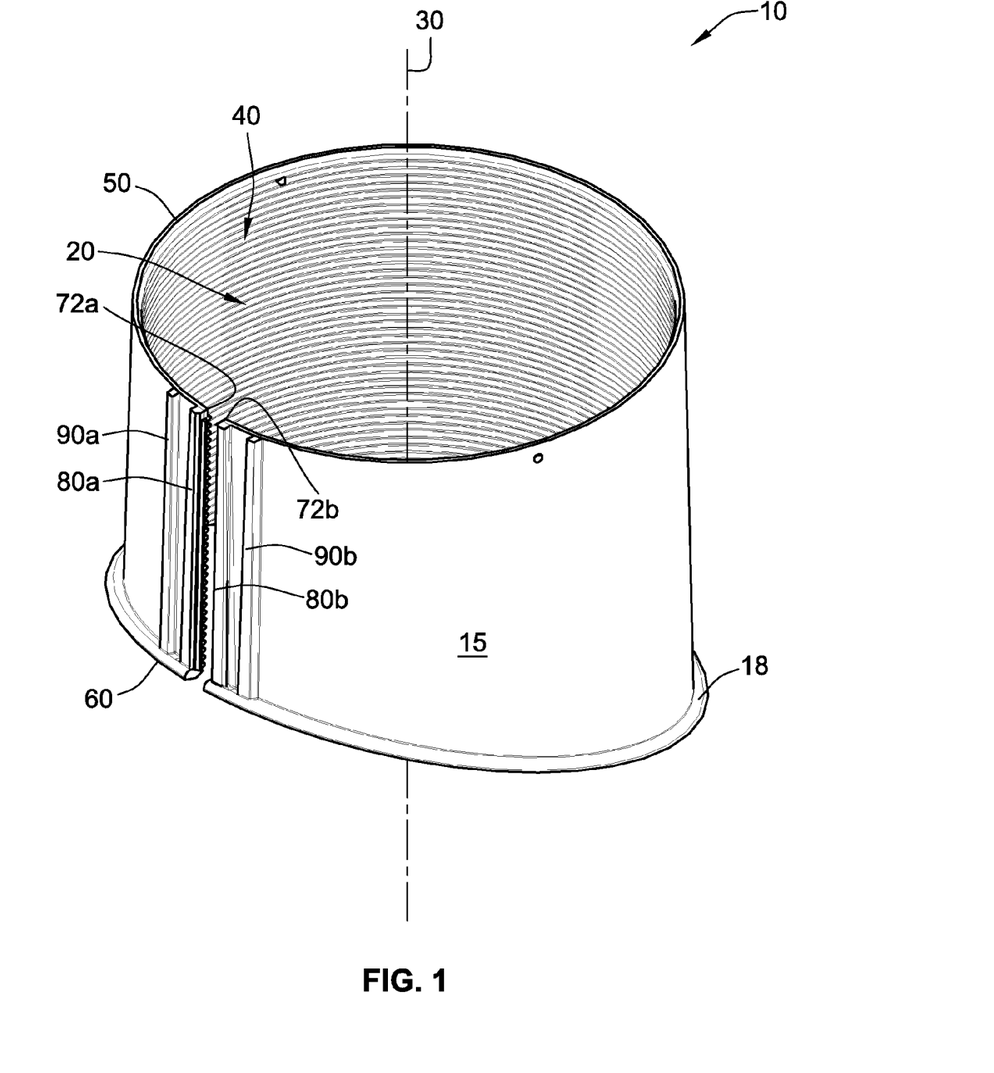
FIG. 1 is a perspective view of a one-piece, sloped baffle.

The outer generally cylindrical surface 15 and/or the generally cylindrical central opening 20 can include a slight taper with respect to the central axis 30, also known as a draft angle. For example, the outer generally cylindrical surface 15 and/or the generally cylindrical central opening 20 can have an inward taper of about one degree with respect to the central axis 30 such that an outer diameter and/or an inner diameter of the one-piece, sloped baffle 10 decreases from the second elliptical end 60 towards the first circular end 50. Various other draft or taper angles are contemplated, such as, for example, inward draft angles of 0.5 degrees, 1.5 degrees, 2 degrees, etc.

An interior surface of the one-piece, sloped baffle 10 includes a plurality of grooves 40 that extend circumferentially therearound. The plurality of grooves 40 aid in diffusing light in a uniform manner along a height of the one-piece, sloped baffle 10. The plurality of grooves 40 is positioned along the height of the one-piece, sloped baffle 10 between the open circular end 50 and the open elliptical end 60 such that substantially all of the interior surface is covered by the plurality of grooves 40 (best shown in FIG. 4). The height of the one-piece, sloped baffle 10 varies in a direction perpendicular to the central axis 30 due to the oblique angle, α, of the open elliptical end 60 (best shown in FIG. 4). The one-piece, sloped baffle 10 has a minimum height $h_1$ and a maximum height $h_2$, both of which are a function of the oblique angle, α. The larger the oblique angle, α, the greater the difference height, $h_3$, between the minimum and maximum heights $h_1$ and $h_2$ of the one-piece, sloped baffle 10.

Figure 2:
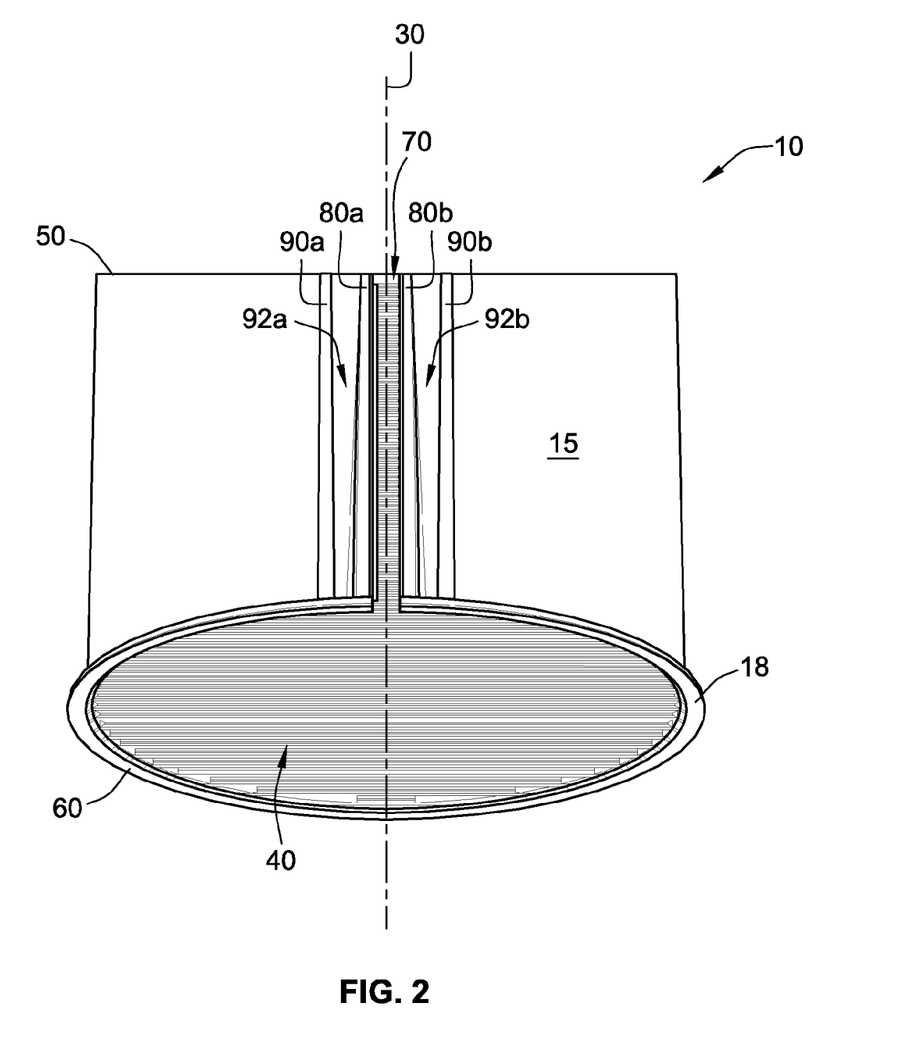
FIG. 2 is a front view of the one-piece, sloped baffle of FIG. 1.
Figure 3:
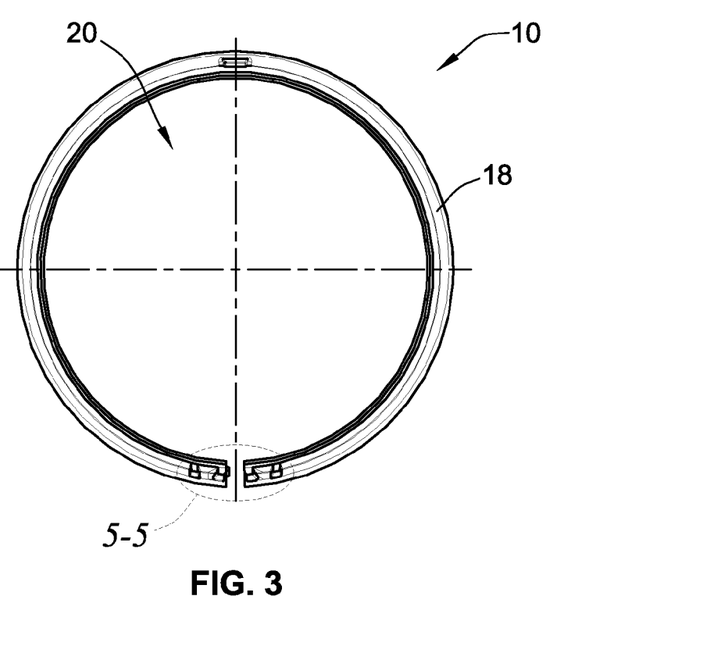
FIG. 3 is a top view of the one-piece, sloped baffle of FIG. 1.
Figure 4:
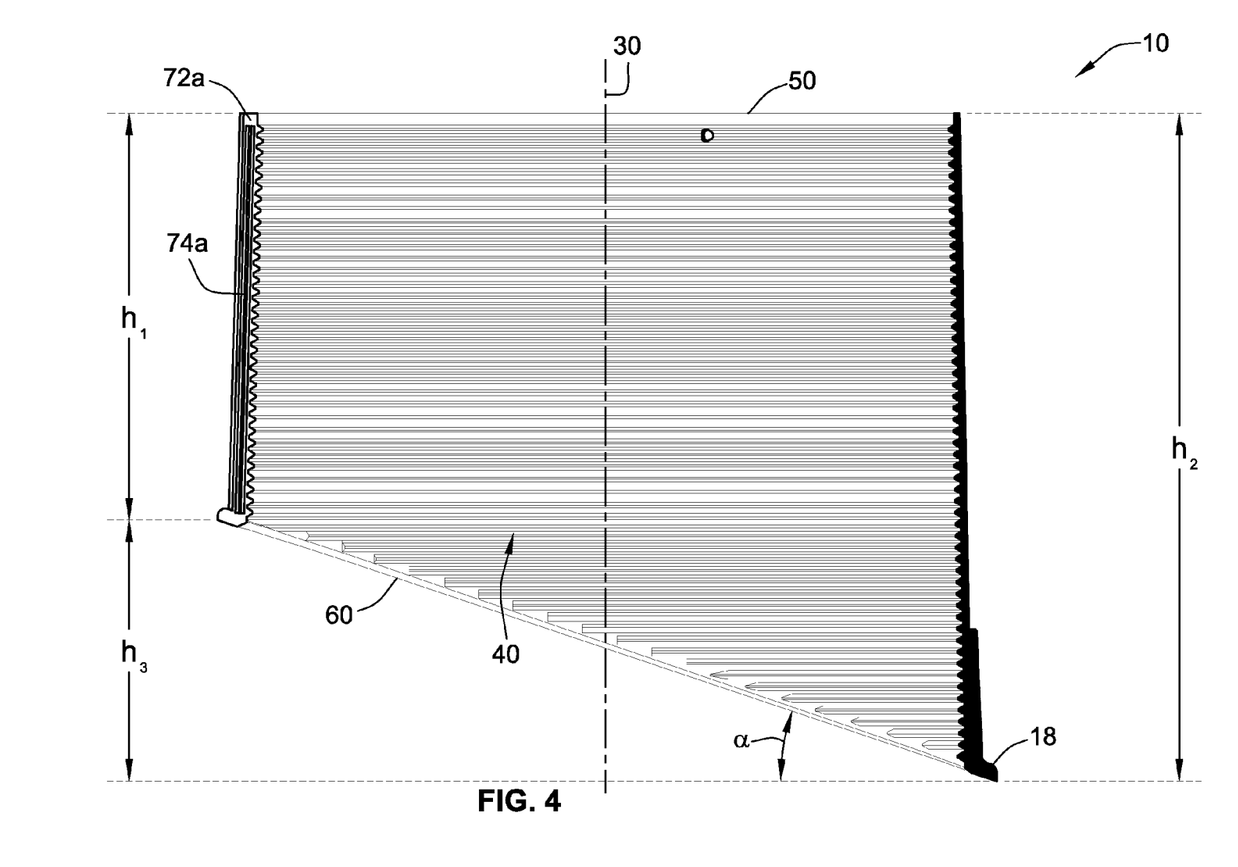
FIG. 4 is a side cross-sectional view of the one-piece, sloped baffle of FIG. 1.

Each one of the plurality of grooves 40 is positioned in a separate plane that is perpendicular to the central axis 30. As best shown in FIGS. 2 and 4, each one of the plurality of grooves 40 located along the minimum height $h_1$ is substantially uniform and contiguous about the interior surface except for a substantially vertical break or seam along an opening or vertical slot 70. Each of the grooves 40 located along the difference height, $h_3$, has a shortened circumference as compared to the circumference of the grooves 40 located along the minimum height, $h_1$, due to the sloped portion (best shown in FIG. 4).

Each one of the grooves 40 has a depth. For example, each one of the grooves 40 can have a depth between about 10 mils and about 90 mils. For another example, each groove can have a depth between about 35 mils and 55 mils. The plurality of grooves 40 can have a range of densities along the height of the one-piece, sloped baffle 10. For example, the plurality of grooves 40 can include between 5 and 20 grooves per linear inch of height of the one-piece, sloped baffle 10. For another example, the plurality of grooves 40 can include between 8 and 12 grooves per linear inch of height of the one-piece, sloped baffle 10. For a groove density of 10 grooves per lineal inch of height and a height of five inches, the one-piece, sloped baffle 10 can include about fifty separate and distinct grooves 40 in total.

While the plurality of grooves 40 is shown and described as covering substantially all of the interior surface from the open circular end 50 to the open elliptical end 60, it is contemplated that the plurality of grooves 40 can extend along a portion of the height of the one-piece, sloped baffle 10. For example, it is contemplated that the plurality of grooves 40 extends along 90 percent (not shown) of the height of the one-piece, sloped baffle 10.

Figure 6A:
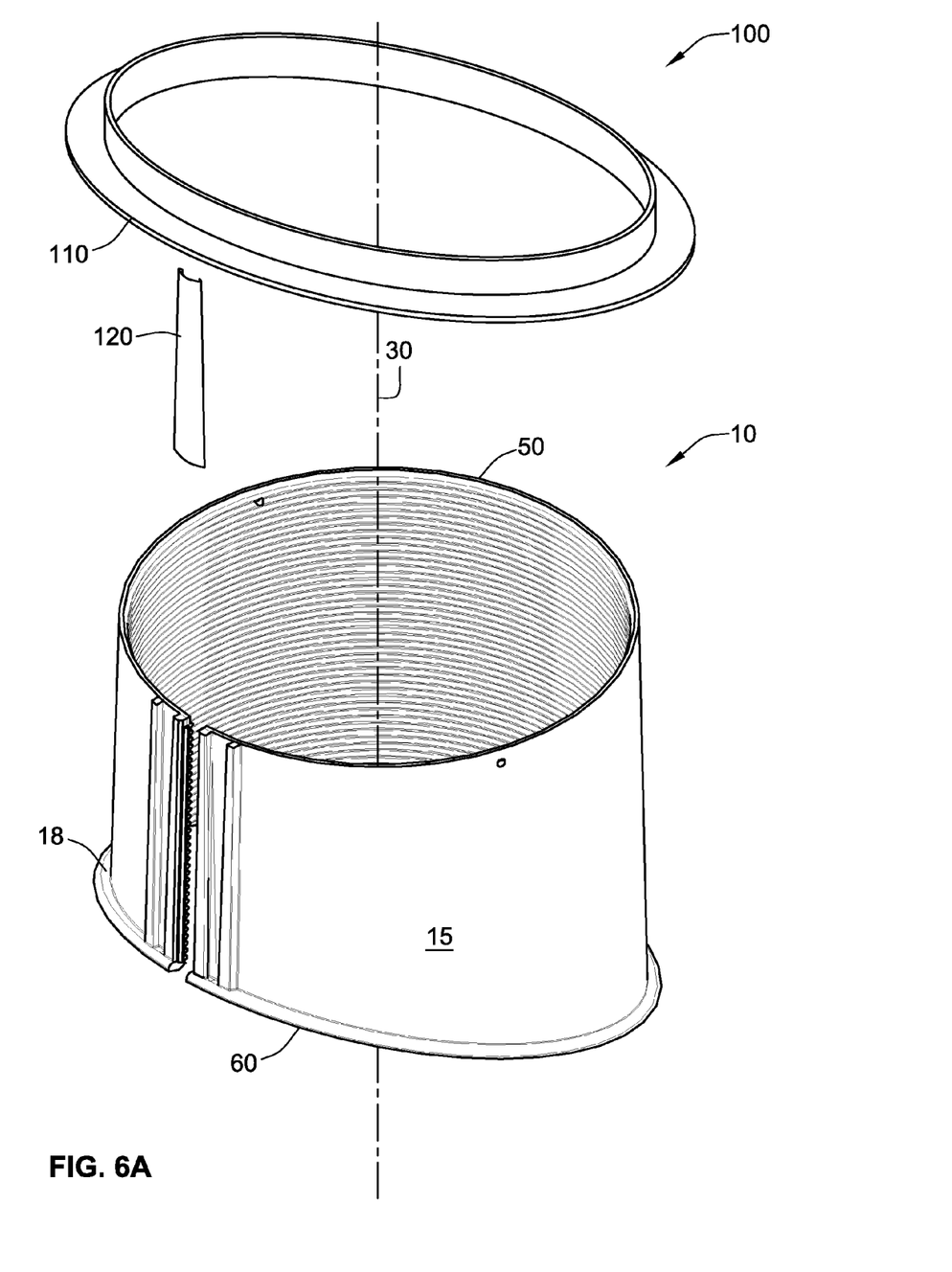
FIG. 6A is an exploded perspective view of a baffle assembly including the baffle of FIG. 1, a trim ring, and a fastener.
Figure 6B:
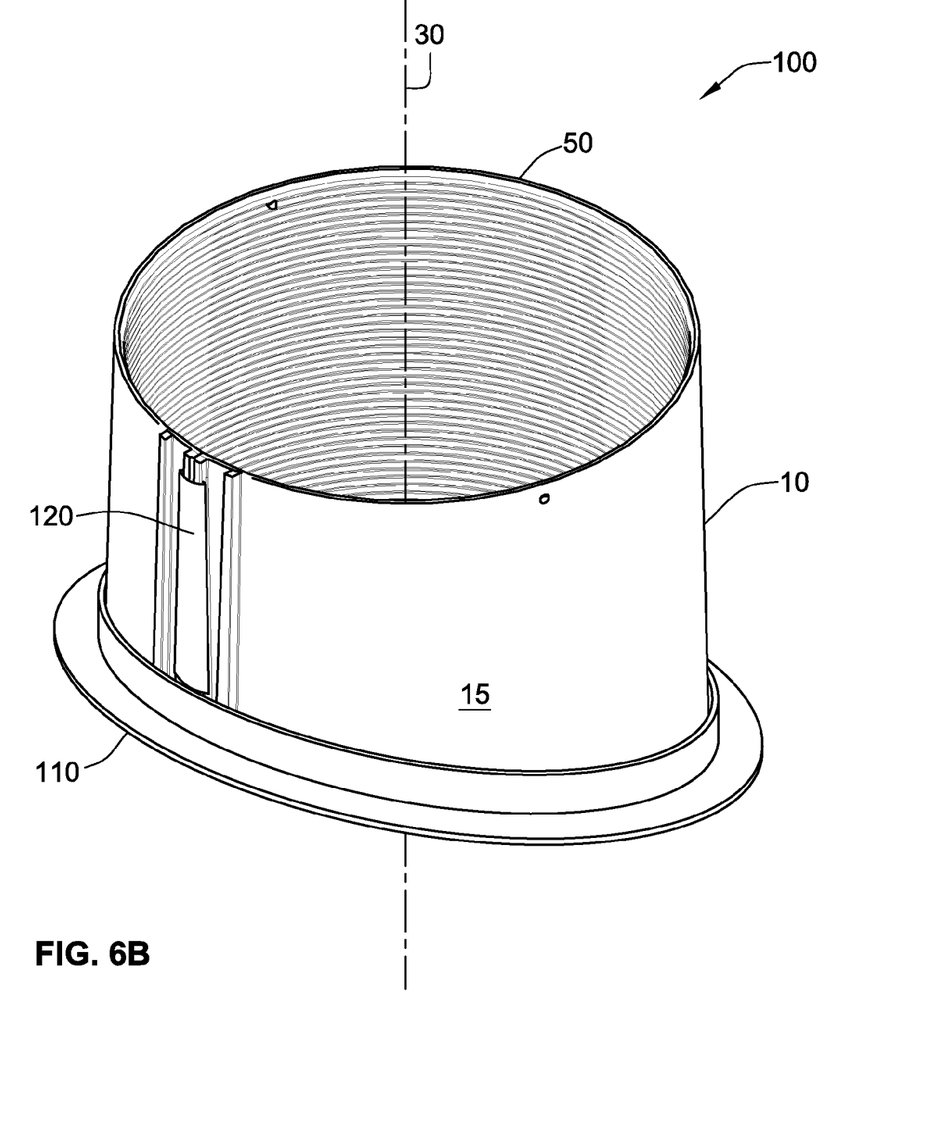
FIG. 6B is an assembled perspective view of the baffle assembly of FIG. 6A.

The one-piece, sloped baffle 10 is movable between a resting position (FIG. 1), an expanded position (not shown), and an assembled position (FIG. 6B). A width, w, of the opening 70 changes depending on the position of the one-piece, sloped baffle 10. In the resting position (FIG. 1), the opening 70 has a first width, in the expanded position (not shown), the opening 70 has a second width, and in the assembled position (FIG. 6B), the opening 70 has a third width. The first, second, and third widths are different from one another.

The width, w, of the opening 70 can be increased temporarily when the one-piece, sloped baffle 10 is moved from the resting position to the expanded position during the formation process to aid in removing the one-piece, sloped baffle 10 from a mold (not shown). Additionally, the width, w, of the opening 70 can be decreased (e.g., to about zero inches) when the one-piece, sloped baffle 10 is moved from the resting position to the assembled position during the assembly process of the one-piece, sloped baffle 10 (shown in FIG. 6B).

The opening 70 extends between the open circular end 50 and the open elliptical end 60 (i.e., along the entire minimum height, $h_1$, of the one-piece, sloped baffle 10). The width, w, of the opening 70 can be a variety of percentages of the circumference of the one-piece, sloped baffle 10 (best shown in FIG. 5) depending on the position of the one-piece, sloped baffle 10. For example, in the resting or expanded position, the width, w, of the opening 70 can be between 0.5 percent and 5 percent of the circumference of the one-piece, sloped baffle 10. For another example, in the assembled position (FIG. 6B), the width, w, of the opening 70 can be between 0 percent and 0.5 percent of the circumference of the one-piece, sloped baffle 10.

For another example, in the resting position, the width, w, of the opening 70 can be about 1.5 percent of the circumference of the one-piece, sloped baffle 10. In such an example, if the outer diameter, D, of the one-piece, sloped baffle 10 is 5.5 inches, the circumference, c, of the one-piece, sloped baffle 10 is calculated using the formula $c=\pi*D$, where c is about 17.3 inches. If the opening is 1.5 percent of the circumference, the width, w, is about 0.26 inches. If the width, w, of the opening 70 in the expanded position is two times the width, w, in the resting position, the width, w, of the opening 70 is about 0.5 inches when the one-piece, sloped baffle 10 is in the expanded position. If the width, w, of the opening 70 in the expanded position is three times the width, w, in the resting position, the width, w, of the opening 70 is about 0.75 inches when the one-piece, sloped baffle 10 is in the expanded position. Various other widths, w, of the opening 70 in the resting and expanded positions are contemplated.

Figure 5:
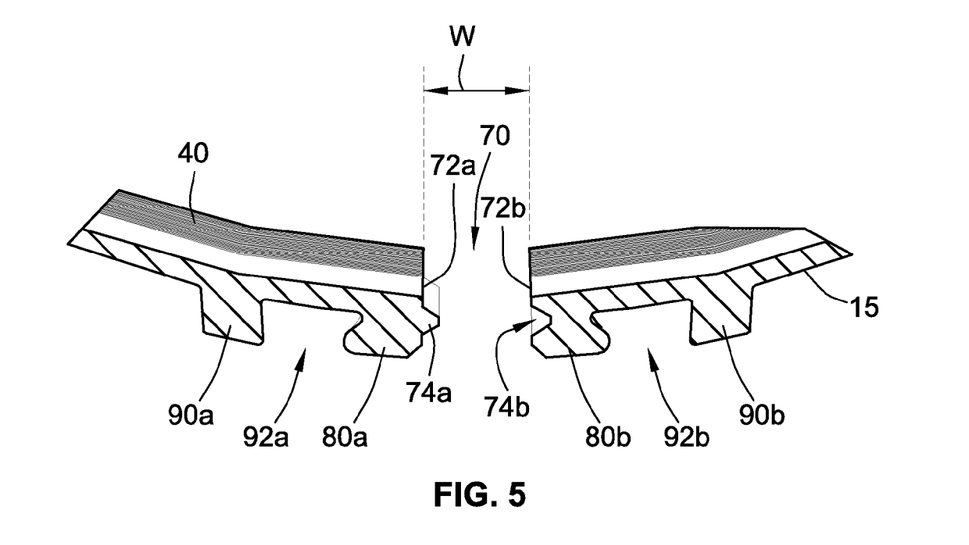
FIG. 5 is a partial top cross-sectional view of the one-piece, sloped baffle of FIG. 1.

The one-piece, sloped baffle 10 includes a pair of opposing edges 72a,b (best shown in FIGS. 1 and 5). The opposing edges 72a,b are substantially parallel with the central axis 30 and positioned on opposite sides of the opening 70. The distance between the opposing edges is equal to the width, w, of the opening 70. A first one of the edges 72a is configured to abut or touch the second one of the edges 72b, such that the width, w, is about zero inches, in response to the one-piece, sloped baffle 10 being in the assembled positioned (shown in FIG. 6B). Optionally, the first edge 72a can include a protrusion or rib 74a that is configured to engage a groove 74b included in the second edge 72b in a tongue and groove type connection (best shown in FIG. 5).

First projections or ribs 80a,b are positioned on opposite sides of the opening 70 and aligned with respective ones of the opposing edges 72a,b. Specifically, a first one of the first projections 80a abuts the first edge 72a such that a portion of the first one of the first projections 80a forms a portion of the first edge 72a (best shown in FIG. 5). Similarly, a second one of the first projections 80b abuts the second edge 72b such that a portion of the second one of the first projections 80b forms a portion of the second edge 72b (best shown in FIG. 5). Alternatively, it is contemplated that the first projections 80a,b can be set back from the edges 72a,b a radial distance such that the first projections 80a,b do not form a portion of the edges 72a,b.

While the first projections 80a,b are shown as extending from the open circular end 50 to the elliptical flange 18, it is contemplated that the first projections 80*a,b* can extend a shorter distance, such as, for example, 10 percent shorter, 20 percent shorter, 50 percent shorter, etc. While each of the first projections 80*a,b* is shown as being a single continuous rib or projection (see FIGS. 1 and 2), it is contemplated that each of the first projections 80*a,b* can be formed as a plurality of first projections (not shown), such as, for example, 2 projections, 3 projections, 4 projections, etc.

Second projections or ribs 90*a,b* are positioned on opposite sides of the opening 70 at a radial distance from the first projections 80*a,b* to form a space or gap 92*a,b* between corresponding ones of the first projections 80*a,b* and the second projections 90*a,b* (best shown in FIGS. 2 and 5). Specifically, a first one of the second projections 90*a* is positioned a radial distance in a first direction from the opening 70 such that a space 92*a* is formed between the first one of the second projections 90*a* and the first one of the first projections 80*a* (best shown in FIGS. 2 and 5). Similarly, a second one of the second projections 90*b* is positioned a radial distance in a second opposing direction from the opening 70 such that a space 92*b* is formed between the second one of the second projections 90*b* and the second one of the first projections 80*b* (best shown in FIGS. 2 and 5). The spaces 92*a,b* provide a place for a tool (not shown) to be inserted when urging the second projections 90*a,b* away from one another to expand the opening 70 and thereby enlarge the generally cylindrical opening 20.

The tool used to urge the second projections 90*a,b* away from one another can include a portion of a robotic arm. The engaging portion of the tool can include one or more fingers (e.g., a fork-like structure) configured to abut at least a portion of one or more of the second projections 90*a,b* in order to exert a force thereon. It is contemplated that the tool includes two or more fingers (e.g., a fork-like structure), one for engaging each of the second projections 90*a,b*. The fingers can be spread apart to urge the second projections 90*a,b* away from each other. The tool can be controlled manually by an operator of a robotic arm or automatically by one or more processors configured to control movement of the tool. Alternatively, the tool can be a completely manual tool similar to a pair of pliers or the like.

The second projections 90*a,b* can be positioned radially along the outer generally cylindrical surface 15 of the one-piece, sloped baffle 10 at a variety of degrees from the opening 70. For example, each of the second projections 90*a,b* can be position radially no more than 45 degrees from the opening 70. For another example, each of the second projections 90*a,b* can be position radially no more than 30 degrees from the opening 70. For yet another example, each of the second projections 90*a,b* can be position radially no more than 15 degrees from the opening 70.

While the second projections 90*a,b* are shown as extending from the open circular end 50 to the elliptical flange 18, it is contemplated that the second projections 90*a,b* can extend a shorter distance, such as, for example, 10 percent shorter, 20 percent shorter, 50 percent shorter, etc. While each of the second projections 90*a,b* is shown as being a single continuous rib or projection (see FIGS. 1 and 2), it is contemplated that each of the second projections 90*a,b* can be formed as a plurality of second projections (not shown), such as, for example, 2 projections, 3 projections, 4 projections, etc.

Referring to FIGS. 6A and 6B, a one-piece, sloped baffle assembly 100 includes the one-piece, sloped baffle 10, an elliptical trim ring 110, and at least one fastener 120. As shown in FIG. 6A, the elliptical trim ring 110 is configured to be slid over the one-piece, sloped baffle 10 such that the elliptical trim ring 110 at least partially abuts the elliptical flange 18 of the one-piece, sloped baffle 10. The fastener 120 can be a spring clip or other type of fastening device that is configured to bias the opposing edges 72*a,b* of the one-piece, sloped baffle 10 towards one another (best shown in FIG. 6B), reducing the width, w, of the opening 70 to approximately zero inches. That is, the fastener 120 effectively eliminates the opening 70 by biasing the edges 72*a,b* such that the first edge 72*a* touches the second edge 72*b*.

Figure 7:
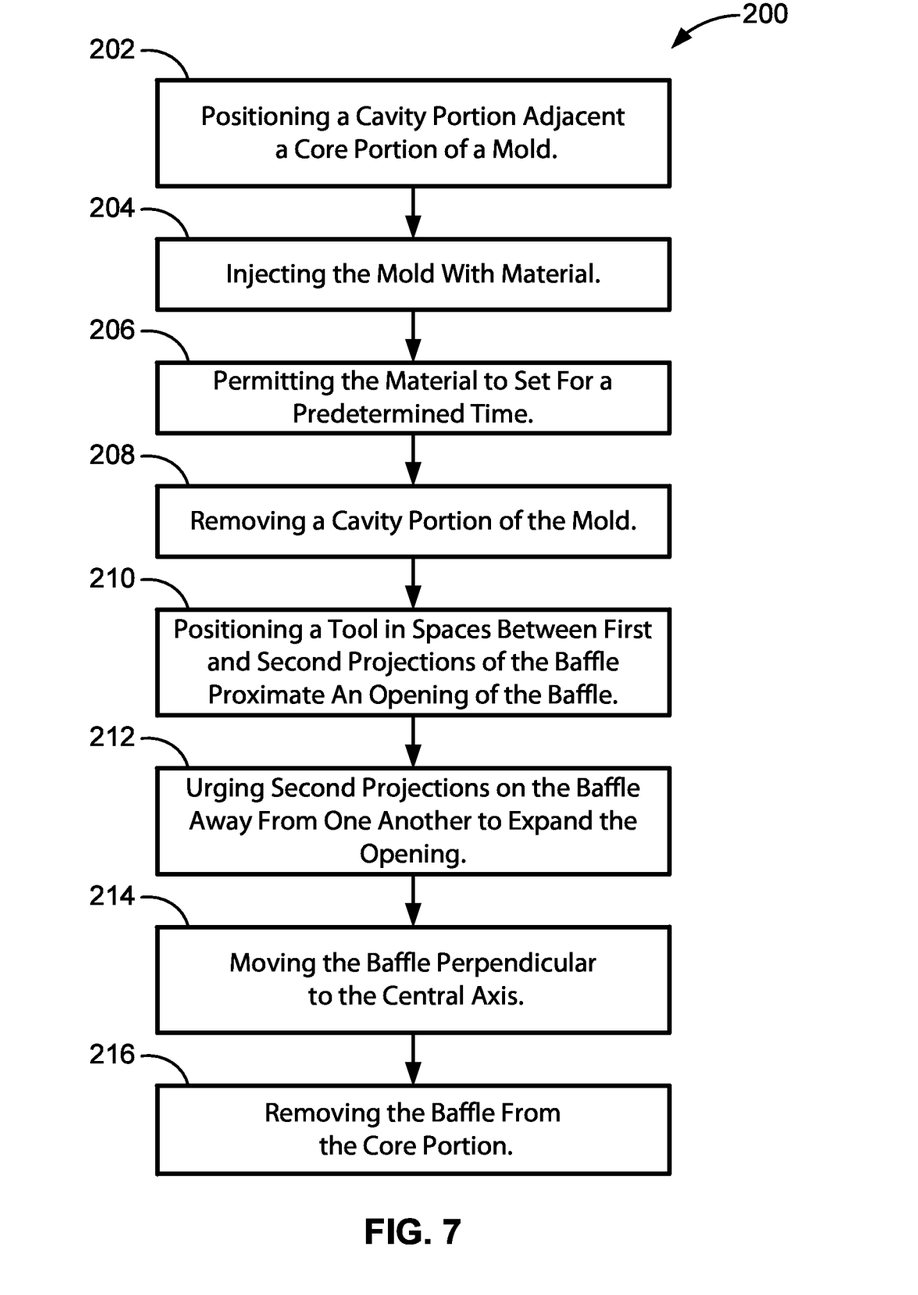
FIG. 7 is a flow chart of a method of forming a one-piece, sloped baffle.

Referring to FIG. 7, a method (200) of forming the one-piece, sloped baffle 10, described above and shown in FIGS. 1-5, using a mold (not shown) includes positioning a cavity portion of the mold adjacent to a core portion of the mold (202). The mold is injected with a material suitable for forming the one-piece, sloped baffle 10 (204). After the material is injected, the material is permitted to set or harden for a predetermined amount of time (206). The material can be allowed to harden between 10 seconds and 3 minutes depending on the type of material.

After the material hardens such that the one-piece, sloped baffle 10 is at least semi-rigid, but still pliable or semi-flexible, the cavity portion of the mold is removed (208) exposing the outer generally cylindrical surface 15 of the one-piece, sloped baffle 10. The plurality of grooves 40 of the one-piece, sloped baffle 10 remain engaged with corresponding projections (not shown) on the core portion of the mold such that the one-piece, sloped baffle 10 cannot be removed from the core portion of the mold in a direction of the central axis 30.

A tool (not shown) is generally positioned in the spaces 92*a,b* between the first projections 80*a,b* and the second projections 90*a,b* proximate the opening 70 of the one-piece, sloped baffle 10 (210). Using the tool, the second projections 90*a,b* are urged away from one another to expand or enlarge the opening 70 (212). The expanding and urging causes the one-piece, sloped baffle 10 to be moved from the resting position (FIG. 1) to the expanded position (not shown) wherein the width, w, of the opening 70 is increased. The expanding and urging further causes the generally cylindrical central opening 20 to be enlarged. The enlarging of the generally cylindrical central opening 20 provides clearance for the one-piece, sloped baffle 10 to be removed in the direction of the central axis without damaging or deforming the one-piece, sloped baffle 10. The expanding and urging can cause an inner diameter of the one-piece, sloped baffle 10 to increase by at least one percent and no more than ten percent. For example, the expanding and urging can cause an inner diameter of the one-piece, sloped baffle 10 to increase by about two percent, three percent, or four percent.

The one-piece, sloped baffle 10 is moved in a direction perpendicular to the central axis 30 so as to dislodge the one-piece, sloped baffle 10 from the core portion of the mold (214). Specifically, the one-piece, sloped baffle 10 is moved to disengage the plurality of grooves 40 from the corresponding features (not shown) on an exterior surface of the core portion of the mold. The one-piece, sloped baffle 10 is moved a distance, which is a function of the depth of the grooves 40. The deeper the grooves, the greater the distance that the one-piece, sloped baffle 10 is moved in the direction perpendicular to the central axis 30.

Responsive to the one-piece, sloped baffle 10 being expanded and moved, the one-piece, sloped baffle 10 is removed from the core portion of the mold in a direction of the central axis 30 (216). That is, due to the enlarged central opening 20 and the dislodging of the grooves 40, the one-piece, sloped baffle 10 is permitted to be removed from the core portion of the mold in the direction of the central axis without damaging or deforming the one-piece, sloped baffle 10. It is contemplated that the one-piece, sloped baffle 10 can be moved relative to the core portion of the mold while the mold is held in place or the one-piece, sloped baffle 10 can be held in place by, for example, the tool, while the core portion of the mold is moved in the direction of the central axis 30.

While the method 200 is described as including the acts 202-216, it is contemplated that one or more of these acts is optional. For example, the method 200 can only include the acts of 210-216.

Figure 8:
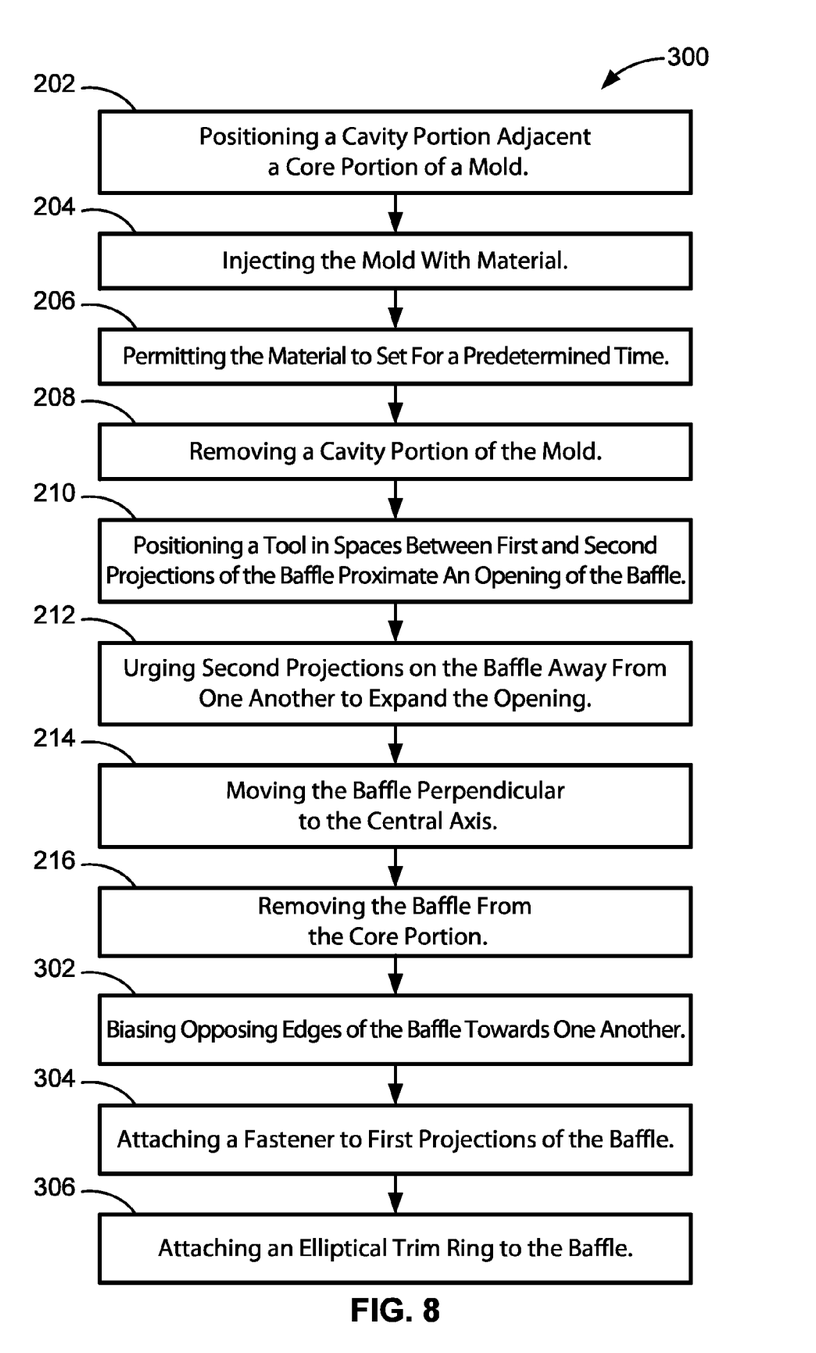
FIG. 8 is a flow chart of a method of assembling a one-piece, sloped baffle assembly.

Referring to FIG. 8, a method (300) of assembling the one-piece, sloped baffle assembly 100 described above and shown in FIGS. 6A and 6B using a mold (not shown) can include the acts 202-216 described above in reference to FIG. 7. The method (300) includes biasing the opposing edges 72a,b of the one-piece, sloped baffle 10 towards one another (302). The biasing can be accomplished manually or via a tool and/or machine, such as, for example, a robotic arm (not shown). The opposing edges 72a,b can be biased such that the protrusion 74a at least partially engages the groove 74b. Responsive to the edge 72a,b being biased, the fastener 110 is attached to the first projections 80a,b of the one-piece, sloped baffle 10 (304), as shown in FIG. 6B. Prior or subsequent to attaching the fastener 110, the elliptical trim ring 120 is attached to the one-piece, sloped baffle 10. The elliptical trim ring 120 is generally slid over the one-piece, sloped baffle 10 from the open circular end 50 towards the open elliptical end 60 such that the elliptical trim ring 120 at least partially abuts the elliptical flange 18 of the one-piece, sloped baffle 10, as shown in FIG. 6B.

While the one-piece, sloped baffle 10 is described above and shown in the FIGS. as having a sloped bottom portion with the open elliptical end 60, it is contemplated that the one-piece, sloped baffle 10 can instead be a cylindrical baffle (not shown). The cylindrical baffle includes an open circular top end, an open circular bottom end, and a generally cylindrical central opening having a central axis extending between the ends of the cylindrical baffle. According to such an alternative, the top and bottom ends are each defined by a plane that is perpendicular to the central axis of the cylindrical baffle. The cylindrical baffle includes an opening extending between the ends in the same, or similar, manner at the opening 70. Additionally, the cylindrical baffle includes first projections positioned on opposite sides of the opening in abutting relationship thereto and the cylindrical baffle further including at least one groove beginning on one side of the opening, extending circumferentially around an inner surface of the cylindrical baffle, and ending on the other side of the opening in the same, or similar, manner as the grooves 40. The methods of forming (200) and assembling (300) described above in reference to FIGS. 7 and 8 can similarly be applied to a cylindrical baffle.

Words of degree such as "substantially" or "about" are used herein in the sense of "at, or nearly at, given the process, control, and material limitations inherent in the stated circumstances" and are used herein to keep the unscrupulous infringer from taking advantage of unqualified or absolute values stated for exemplary embodiments.

While particular embodiments and applications of the present disclosure have been illustrated and described, it is to be understood that the disclosure is not limited to the precise construction and compositions disclosed herein and that various modifications, changes, and variations may be apparent from the foregoing descriptions without departing from the spirit and scope of the disclosure as defined in the appended claims.

What is claimed is:

1. A method of making a one-piece, sloped baffle for use in a lighting fixture configured to be installed in a sloped orientation, the method comprising:
    forming a one-piece, sloped baffle using a mold, the baffle having an open circular end, an open elliptical end, and a generally cylindrical central opening having a central axis extending between the ends of the baffle, a plane defining the open elliptical end being at an oblique angle relative to the central axis, the baffle including an opening extending between the ends, first projections positioned on opposite sides of the opening in abutting relationship thereto, the baffle further including at least one groove beginning on one side of the opening, extending circumferentially around an inner surface of the baffle, and ending on the other side of the opening;
    positioning a tool proximate to the opening;
    using the tool, expanding the opening thereby enlarging the cylindrical central opening; and
    responsive to the expanding, removing the baffle from the mold along a direction of the central axis.

2. The method of claim 1, wherein the baffle further includes second projections positioned on opposite sides of the opening at a radial distance from the first projections to form a space between corresponding ones of the first and second projections.

3. The method of claim 2, wherein the positioning includes positioning the tool in the corresponding spaces between the first and second projections.

4. The method of claim 3, wherein the expanding includes urging the second projections away from one another to expand the opening thereby enlarging the generally cylindrical central opening.

5. The method of claim 1, further comprising, prior to the removing and responsive to the expanding, using the tool, moving the baffle in a direction generally perpendicular to the central axis to dislodge the baffle from the mold.

6. The method of claim 1, further comprising, prior to the positioning, removing a cavity portion of the mold such that the baffle remains on a core portion of the mold, the at least one groove being engaged with a corresponding projection feature on the core portion such that the baffle cannot be removed from the core portion in the direction of the central axis.

7. The method of claim 6, further comprising:
    prior to the removing the cavity portion, positioning the cavity portion adjacent to the core portion such that the mold is configured to receive material for forming the baffle;
    injecting the mold with the material; and
    permitting the material to set for a predetermined amount of time such that the baffle is at least semi-rigid.

8. The method of claim 1, wherein the baffle is movable between a resting position wherein the opening has a first width, an expanded position wherein the opening has a second width, and an assembled position wherein the opening has a third width, the first, second, and third widths being different.

9. The method of claim 8, wherein the expanding includes moving the baffle from the resting position to the expanded position such that the second width of the opening is at least twice the first width of the opening.

10. The method of claim 8, wherein the first width of the opening when the baffle is in the resting position prior to the expanding is no more than five percent of a circumference of the baffle.

11. The method of claim 1, wherein the expanding causes an inner diameter of the baffle to increase by at least about one percent.

12. The method of claim 1, wherein the baffle includes opposing edges substantially parallel with the central axis and on opposite sides of the opening, one of the edges includes a protrusion configured to engage a corresponding groove formed in the other of the edges.

13. The method of claim 1, wherein the removing the baffle includes holding the baffle using the tool and moving at least a portion of the mold in the direction of the central axis.

14. A method of assembling a one-piece, sloped baffle for use in a lighting fixture configured to be installed in a sloped orientation, the method comprising:
    forming a one-piece, sloped baffle using a mold, the baffle having an open circular end, an open elliptical end, and a generally cylindrical central opening having a central axis extending between the ends of the baffle, a plane defining the open circular end being perpendicular to the central axis, a plane defining the open elliptical end being at an oblique angle relative to the central axis, the baffle including an opening extending between the ends, the baffle including opposing edges substantially parallel with the central axis and on opposite sides of the opening, first projections positioned on opposite sides of the opening and aligned with the opposing edges, and second projections positioned on opposite sides of the opening at a radial distance from the first projections, the baffle further including a plurality of grooves extending circumferentially around an inner surface of the baffle;
    urging, using a tool, the second projections away from one another to expand the opening such that the generally cylindrical central opening is enlarged;
    responsive to the urging, moving the baffle in a direction generally perpendicular to the central axis to disengage the plurality of grooves from corresponding projection features on the mold;
    responsive to the moving, removing the baffle from the mold along a direction of the central axis; and
    attaching a fastener to at least a portion of the first projections on opposite sides of the opening to bias the opposing edges towards one another thereby securely closing the opening.

15. The method of claim 14, wherein the baffle further includes an elliptical flange at the open elliptical end of the baffle.

16. The method of claim 15, further comprising attaching an elliptical trim ring to the baffle such that the elliptical trim ring at least partially abuts the elliptical flange.

17. The method of claim 14, wherein the plurality of grooves is positioned along a height of the baffle between the ends, each of the grooves lying in a separate plane perpendicular to the central axis.

18. The method of claim 14, wherein the fastener biases the opposing edges towards one another such that at least a portion of the plurality of grooves is substantially contiguous across the opening.

19. A method of making a one-piece baffle for use in a lighting fixture, comprising:
    forming a one-piece baffle using a mold, the baffle having an open circular top end, an open circular bottom end, and a generally cylindrical central opening having a central axis extending between the ends of the baffle, a first plane defining the open circular top end being perpendicular to the central axis, a second plane defining the open circular bottom end being perpendicular to the central axis, the baffle including an opening extending between the ends, first projections positioned on opposite sides of the opening in abutting relationship thereto, the baffle further including at least one groove beginning on one side of the opening, extending circumferentially around an inner surface of the baffle, and ending on the other side of the opening;
    positioning a tool proximate to the opening;
    using the tool, expanding the opening thereby enlarging the cylindrical central opening; and
    responsive to the expanding, removing the baffle from the mold along a direction of the central axis.

20. The method of claim 19, wherein the baffle further includes second projections positioned on opposite sides of the opening at a radial distance from the first projections to form a space between corresponding ones of the first and second projections.

21. The method of claim 20, wherein the positioning includes positioning the tool in the corresponding spaces between the first and second projections.

22. The method of claim 21, wherein the expanding includes urging the second projections away from one another to expand the opening thereby enlarging the generally cylindrical central opening.

23. The method of claim 19, further comprising, prior to the removing and responsive to the expanding, using the tool, moving the baffle in a direction generally perpendicular to the central axis to dislodge the baffle from the mold.

24. The method of claim 19, further comprising, prior to the positioning, removing a cavity portion of the mold such that the baffle remains on a core portion of the mold, the at least one groove being engaged with a corresponding projection feature on the core portion such that the baffle cannot be removed from the core portion in the direction of the central axis.

25. The method of claim 19, wherein the baffle is movable between a resting position wherein the opening has a first width, an expanded position wherein the opening has a second width, and an assembled position wherein the opening has a third width, the first, second, and third widths being different.

26. The method of claim 25, wherein the expanding includes moving the baffle from the resting position to the expanded position such that the second width of the opening is at least twice the first width of the opening.

27. The method of claim 25, wherein the first width of the opening when the baffle is in the resting position prior to the expanding is no more than five percent of a circumference of the baffle.

28. The method of claim 19, wherein the expanding causes an inner diameter of the baffle to increase by at least about one percent.

29. The method of claim 19, wherein the baffle includes opposing edges substantially parallel with the central axis and on opposite sides of the opening, one of the edges includes a protrusion configured to engage a corresponding groove formed in the other of the edges.

30. The method of claim 19, wherein the removing the baffle includes holding the baffle using the tool and moving at least a portion of the mold in the direction of the central axis.

31. The method of claim 19, wherein the baffle is a one-piece cylindrical baffle.

* * * * *